United States Patent
Coulter et al.

(10) Patent No.: US 8,327,361 B2
(45) Date of Patent: Dec. 4, 2012

(54) METHOD AND SYSTEM FOR STORING AND REFERENCING PARTIAL COMPLEX RESOURCES USING OBJECT IDENTIFIERS IN A PRINTING SYSTEM

(75) Inventors: Justin Coulter, Longmont, CO (US); Timothy Towns, Longmont, CO (US); Israel Maloney, Boulder, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 1069 days.

(21) Appl. No.: 12/262,882

(22) Filed: Oct. 31, 2008

(65) Prior Publication Data

US 2010/0115516 A1    May 6, 2010

(51) Int. Cl.
*G06F 9/46* (2006.01)
(52) U.S. Cl. ...................................................... 718/100
(58) Field of Classification Search .................. None
See application file for complete search history.

(56) References Cited

U.S. PATENT DOCUMENTS

| | | |
|---|---|---|
| 6,867,874 B1 | 3/2005 | Shima |
| 6,992,785 B1 | 1/2006 | Chatcavage et al. |
| 2004/0156075 A1 | 8/2004 | Hohensee et al. |
| 2005/0094173 A1 | 5/2005 | Engelman et al. |
| 2007/0273923 A1 | 11/2007 | Kimura |
| 2009/0168082 A1* | 7/2009 | Aschenbrenner et al. ..... 358/1.9 |

OTHER PUBLICATIONS

PCT Search Report PCT/US/09/62885. Mailed Dec. 23, 2009. 7 pages.

* cited by examiner

*Primary Examiner* — Meng An
*Assistant Examiner* — Eric C Wai
(74) *Attorney, Agent, or Firm* — Blakely, Sokoloff, Taylor & Zafman (57) ABSTRACT

A print control unit coupled with a printer, the print control unit having host to provide partial resource components to a complex resource generator, the partial resources components including printing instructions. The complex resource generator to generate a shell representing a complex resource, generate a partial complex resource having the partial resource components, the shell to hold the partial complex resource, and store the partial complex resource to be referenced later.

14 Claims, 9 Drawing Sheets

METHOD AND SYSTEM FOR STORING AND REFERENCING PARTIAL COMPLEX RESOURCES USING OBJECT IDENTIFIERS IN A PRINTING SYSTEM

FIELD

This invention relates generally to the field of printing systems. More particularly, the invention relates to storing and referencing partial complex resources using unique Object Identifiers in a printing system.

BACKGROUND

In today's printing systems, typically, a printer control unit (PCU) deals with numerous resources to manage complex data and presentation objects. For example, there exists situations where the host software connected to the printer control unit utilizes a complex resource having multiple resource components, such as at least one base resource and zero or more resources derived from the base resource, to perform the job of managing complex data and presentation objects prior to printing a document. For example, in the color-matching-resources area, a couple of base resources (e.g., (1) color conversion instructions or profile from a camera, and (2) color conversion instruction or profile relating to a printer) are combined to provide a derived resource (e.g., color conversion) to output data via an output device, such as a printer.

However, often the host software fails to provide a derived resource to the PCU, which forces the PCU to scramble for the necessary derived resource by either searching for an existing derived resource or generating a derived resource. If the PCU is unable to determine derived resource existence, it must generate the derived resource, negatively impacting performance This conventional technique employing a non-complex model generator, an Object Identifier (OID) using standard techniques having the OID components consists only of the derived resource information. Hence, at least one problem with this technique is the loss of base resource information from the derived resource OID. The non-preservation of the base resource information, and therefore the loss of its relationship with the derived resource, prevents any future derived resource discovery using host software-supplied base resource information. Therefore, what is desired is generating and using unique OIDs for derived objects comprised of base resource information in a printing system.

Furthermore, for example, the host software may provide base resources but not other relevant information to locate a derived resource, leading to presenting an incomplete or non-existent complex resource (e.g., an incomplete set of zero or more resource components, a Partial Resource Components (PRC)) to the PCU. When the PCU is requested to utilize an incomplete or non-existent complex resource, the PCU has to either locate the missing resource components or, if not located, internally generate the missing resource components to complete the incomplete complex resource if all missing components are located or generated. The generation of missing resource components is computationally expensive and potentially occurs in the PCU during page processing when runtime performance is most critical. A solution to minimize the missing resource generation is desired.

SUMMARY

In one embodiment, a system having a print control unit coupled with a printer, the print control unit electronically connected to a host to provide base resources components to a complex resource generator, the resource components including printing information. The complex resource generator generates a shell representing a complex resource having one or more resource components, and stores the partial complex resource to be referenced later.

In another embodiment, a method is disclosed. The method includes receiving base resource at a complex resource generator, the resources components including printing instructions; generating a shell representing a partial complex resource; generating a partial complex resource having the resource components, the shell to hold the partial complex resource, store the partial complex resource to be referenced later, and utilize a repeatable resolution of a partial complex resource using only provided base resources.

BRIEF DESCRIPTION OF THE DRAWINGS

A better understanding of the present invention can be obtained from the following detailed description in conjunction with the following drawings, in which.

DETAILED DESCRIPTION

A printing system having a unique OID generator for generating unique OIDs for derived objects is described. In one embodiment, a unique OID is generated to enable a one-time generation of a complex resource and/or subsequent access of the generated complex resource rather than having to regenerate the complex resource each time a process is to be repeated. In one embodiment, Generated Resource Components (GRCs) are received from PCRs so that each time a new PCRs piece is received, it is added to its corresponding cached GRC until a complete resource is available, and an OID is generated and then assigned to access the cached GRC.

For example, there exist situations in a PCU concerning complex resources, defined as resources comprised of multiple resource components, where the host (software) provides an incomplete set of resource components or PRC when presenting a complex resource to the PCU. When the PCU is requested to utilize an incomplete complex resource, the PCU either locates the resource components through internal searching techniques or, if not located, internally generate only the missing resource component(s) that are needed and then possibly complete the complex resource if all missing resource components are available. However, the repeated generation of missing resource components is computationally expensive and potentially occurs in the PCU during page processing when runtime performance is most critical.

In one embodiment, caching a subset of Most Frequently Used (MFU) GRC and preserving a potentially larger set of GRCs in a persistent manner that will survive printer power cycles is disclosed. Caching each GRC facilitates expedient system determination of the GRC existence, identified by a PCU-generated OID. Preserving each GRC across power cycles eliminates the need to regenerate the resource components in the PCU such that they are preserved/not lost even when the printer is reinitialized In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
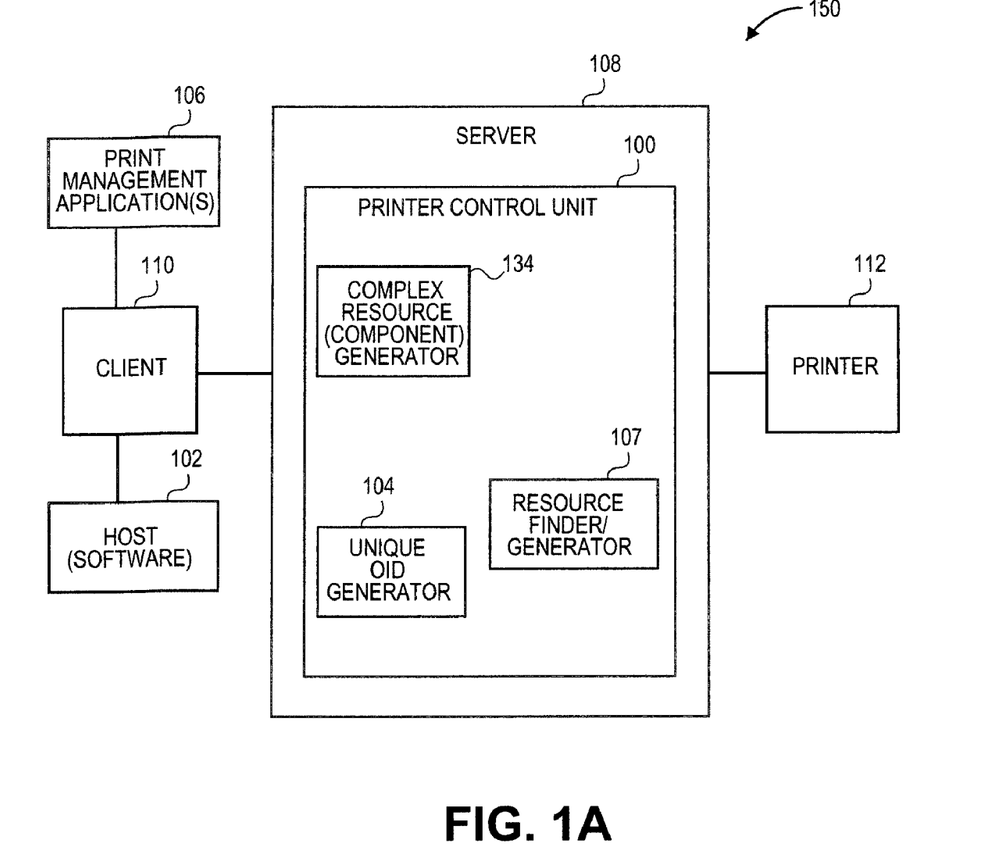
FIGS. 1A and 1B illustrate an embodiment of a unique object identifier generator at a printer control unit of a printing system.

FIG. 1A illustrates an embodiment of a unique object identifier generator 104 at a printer control unit 100 of a printing system 150. In the illustrated embodiment, a computer client system (client) 110 is in communication with a computer server system (server) 108 that is further in communication with a printer 112. Client 110 is further includes or is in communication with host (software) 102 and print management application(s) 106. Server 108 includes a print server having a printer control unit 100. PCU 100 contains unique OID generator 104, recourse finder/generator 107, and complex resource (component) generator 134. Host 102 provides parent resources or resource information (e.g., base resources) to unique OID generator 104. Unique OID generator 104 generates a unique OID for generating a derived resource where the unique OID has the base resources information embedded in it. Resource finder/generator 107 is used to find out whether a derived resource exists internally or needs to be generated. Further, resource finder/generator 107 may be used to perform a lookup of the derived resource using a corresponding unique OID previously generated by the unique OID generator 104, eliminating the need for re-generating derived objects. Complex resource (component) generator 134 works with one or more other components of printer control unit 100 to provide complex resource components based on the information received through base resources. This is further described with reference to FIGS. 1C, 5A, and 5B and throughout this document.

Host 102 utilizes complex resources having at least one base resource and at least one resource derived from the base resource to promote printing in accordance with the instructions contained in one or more base resources. In certain circumstances, host 102 provides merely base resource(s), requiring PCU 100 to internally generate a derived resource and, in one embodiment, to complete the complex resource, a unique OID with embedded base resource information is generated for generating a corresponding derived resource. The unique OID may then be used for internal tracking purpose, eliminating the necessity for regenerating the once-generated derived resource. In one embodiment, unique OID generator 104 generates a unique OID based on the base resource information contained in the base resources to then generate a derived resource. The unique OID generation process for generating the derived resource satisfies future derived resource lookups where merely base resource information is provided, eliminating the need for PCU 100 to repeatedly evaluate whether the derived resource exists internally or repeatedly generate the same derived resource, resulting in saving system resources and enhancing system performance.

For a complex resource, unique OID generation for the derived resource can be a repeatable process wherein all dependent base resources are utilized as input to generate the derived object unique OID. Upon completion of the internal derived resource generation process, the unique OID may be used for internal resource tracking purposes to prevent re-generation of the same derived resource, saving valuable system resources. For example, when host 102 later requests operations involving supplied base resources, PCU 100 uses the unique OID generated by unique OID generator 104 to locate the corresponding derived resource, averting computationally-expensive regeneration of the derived resource. For a non-complex resource, the unique OID generation process eliminates the need for base resources to find the corresponding derived resource.

In one embodiment, a unique OID includes and encodes the parent resource (e.g., base resource) information for the to-be-generated child resource (e.g., derived resource). The encoding of the base resource information in the unique OID is used to avoid duplicates of the corresponding derived resource being generated using the unique OID. The encoding or encrypting may be performed by applying, for example, the Message-Digest algorithm 5 (MD5), Copyright by RSA, to the parent data/instructions of the involved one or more base resources. MD5 is a well-known cryptographic hash function with a 128-bit hash value.

PCU 104 determines when and how to generate a derived resource based upon the information from the host provided base resource(s). If a derived resource is to be internally generated, a derived resource unique OID may be based on the Abstract Syntax Notation One (ASN.1) format to be compatible with other printer control unit managed resource. ASN.1 refers to a formal language for abstractly describing messages to be exchanged among an extensive range of applications involving the Internet, cellular phones, electronic communications, smart networks, printing, wireless broadband, and other resource-restricted and resource-constrained environments.

The transaction sequences of generating a unique OID generation may include the following. First, MD5 is applied to all data or information of the involved one or more parent or base resources. Second, the derived resource object size is calculated based on the size of the base resources. For example, the object size of and the amount of data at each of the base resources are measured to determine the object size of the derived resource (e.g., the object size of the derived resource is the accumulation of the object size and the amount of data/information of each of the base resources). Third, the registered OID seed corresponding to the derived resource type is selected. For example, a certain set of resource objects are registered according to a governing body and these registered objects or seeds are used to help determine the resource types that are being used.

Forth, the generated resource unique OID length is calculated. The unique OID length represents the number of bytes it takes to represent the object size, such as the accumulation of the bytes size of the base resources, the seed, etc. Finally, the OID components of the unique OID are encoded in the ASN.1 format to produce the final derived resource unique OID.

In one embodiment, the aforementioned technique embeds the base resource information in the derived resource MD5 unique OID component, and further embeds the object size of the based resources in the derived resource object size unique OID component. These two components exhibit a relationship between the involved base resources and the derived resource, facilitating repeatable regeneration of the unique OID for lookup purposes while satisfying and maintaining the OID uniqueness.

Figure 1B:
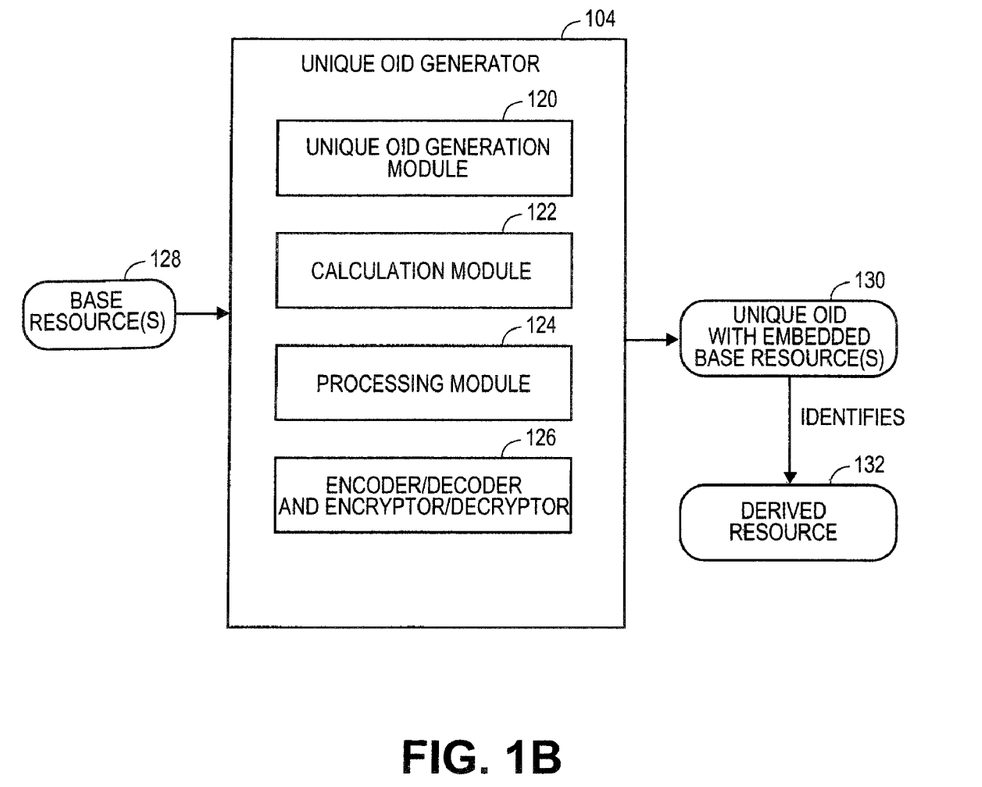

Referring now to FIG. 1B, it illustrates an embodiment of a unique Object Identifier generator 104. In one embodiment, unique OID generator 104 generates a unique OID 130 that includes base information from one or more base resources 128 to provide a corresponding derived resource as described in FIG. 1A. Unique OID generator 104 may include various components or module to perform the necessary functions, calculations, and/or transaction sequences to generate the unique OID 130. In the illustrated embodiment, unique OID generator 104 includes unique OID generation module 120, calculation module 122, processing module 124, and encoder/decoder-encryptor/decryptor 126.

For example, as illustrated with respect to FIG. 1A, the application of MD5 to the relevant base resource information and the encoding of the OID components in the ASN.1 format are performed by encoder/decoder-encryptor/decryptor 126, while other tasks, such as the recognition of the base resource information, certain formats, seeds, etc., verification or validation of certain data, processing of various steps, selection of an OID seed, providing communication between other components 120, 122, 126, and the like may be performed by processing module 124.

Calculation module 122 is used to perform various calculations, such as calculating the object and information size of base resources, object size of a derived resource, byte size of an OID seed, etc. Finally, unique OID generation module generates a unique OID for a derived resource as described throughout this document, while unique OID with embedded base resources 130 identifies the derived resource 132.

Figure 1C:
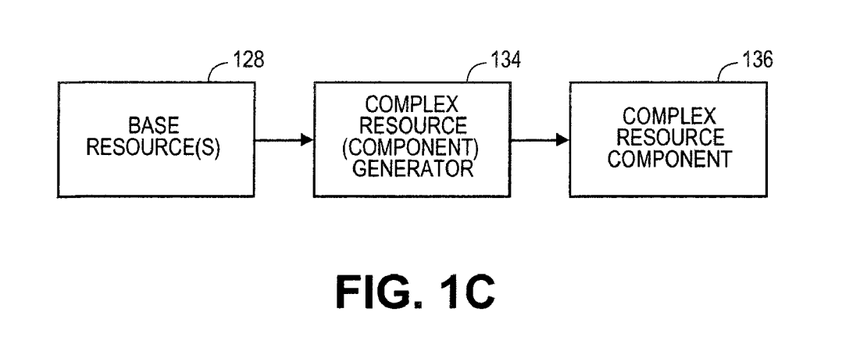
FIG. 1C illustrates the an embodiment of a complex Resource component generator.

Referring now to FIG. 1C, an embodiment of complex resource (component) generator 134 is shown. As illustrated, base resource(s) 128 are received and using the information associated with base resources 128, complex resources component generator 134 produces complex resource component(s) 136. It is contemplated that complex resource (component) generator 134 can work with any number of other components and modules of printer control unit 100 to provide a complex resources component 136. This technique and the use of a complex resource component 136 are described throughout this document.

Figure 2:
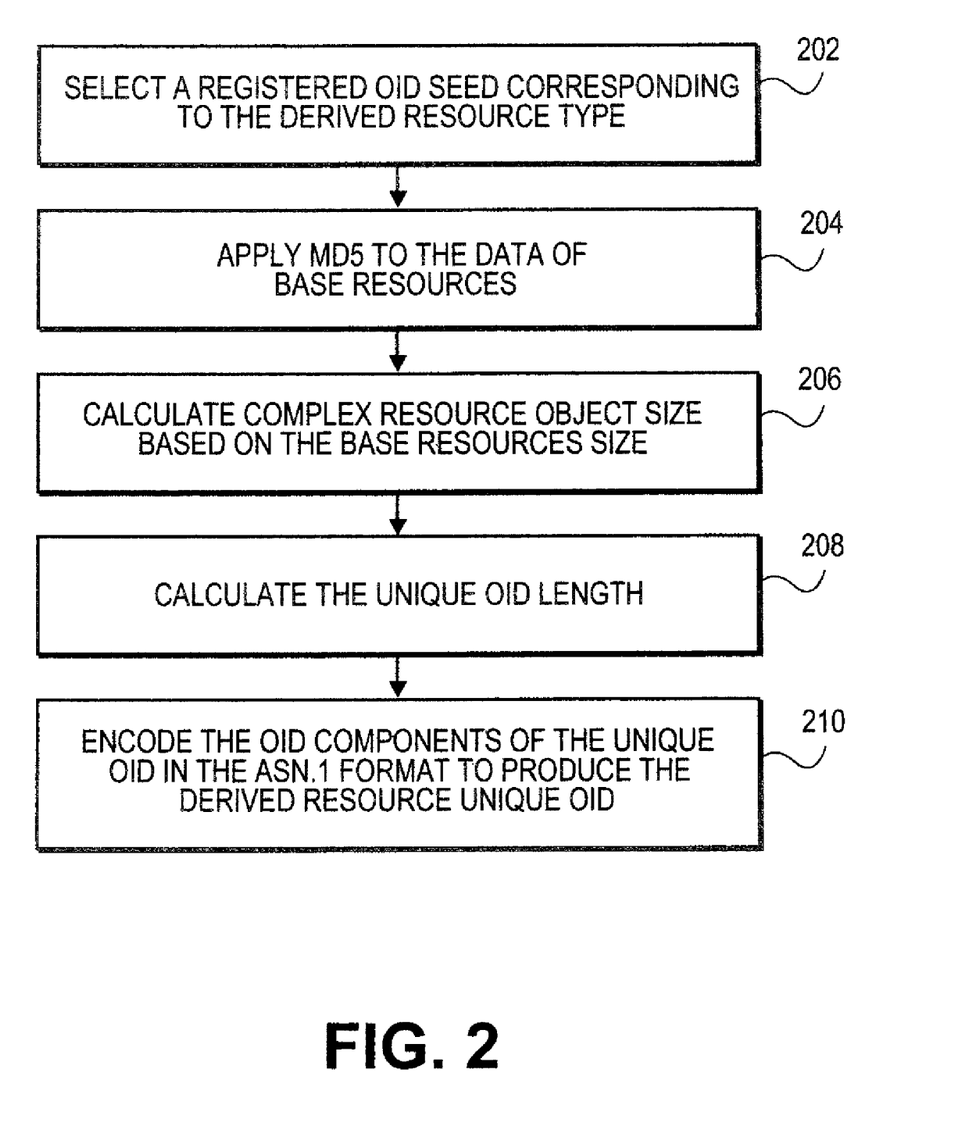
FIG. 2 illustrates an embodiment of a process for generating a unique Object Identifier for a derived resource.

FIG. 2 illustrates an embodiment of a process for generating a unique Object Identifier for a derived resource. In one embodiment, a unique OID is generated to enable a one-time generation of a derived resource and/or subsequent access of the generated derived resource rather than having to regenerate the derived resource each time a process is to be repeated. At processing block 202, a registered OID seed corresponding to a derived resource type is selected. For example, a certain set of resource objects are registered according to a governing body and these registered objects or seeds are used to help determine the type of resources (e.g., base resources) that are being used. At processing block 204, MD5 is applied to all data/information/instructions of the involved one or more parent or base resources. At processing block 206, the complex resource object size is calculated based on the size of the base resources. For example, the object size and the amount of data at each of the base resources are measured to determine the object size of the derived resource (e.g., the object size of the derived resource is the accumulation of the object size and the amount of data of each of the base resources).

At processing block 208, the generated resource unique OID length is calculated. The unique OID length represents the number of bytes it takes to represent the object size, such as the accumulation of the bytes size of the base resources, the seed, etc. At processing block 210, OID components of the unique OID are encoded in the ASN.1 format to produce the final derived resource unique OID.

Figure 3:
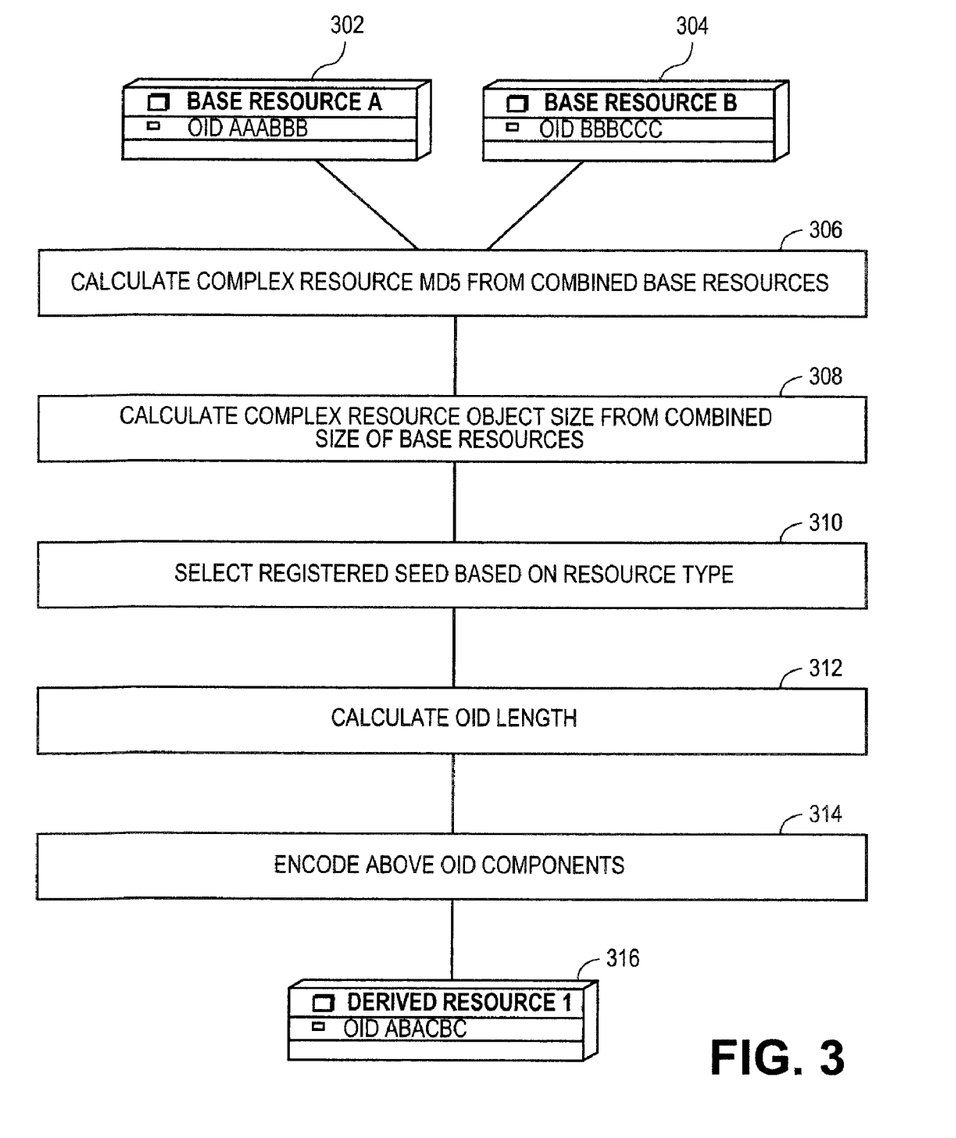
FIG. 3 illustrates an embodiment of a transaction sequence for generating a unique Object Identifier for a derived resource.

FIG. 3 illustrates an embodiment of a transaction sequence for generating a unique Object Identifier for a derived resource. In one embodiment, base resources A 302 (OID AAABBB) and B 304 (OID BBBCCC) are illustrated as they are provided to unique OID generator by host at PCU. At processing block 306, a complex resource MD5 is calculated from the combined base resources 302, 304. At processing block 308, the complex resource object size (e.g., Link Color Conversion Object size: X'24F05') is then calculated from the combined size of the two base resources 302, 304.

At processing block 310, a registered seed (e.g., 1.2.208.171.1) is selected based on the resource type (e.g., Link Color Conversion Color Management Resource) of the base resources 302, 304. The OID length of the unique OID is calculated at processing block 312. The OID components are encoded at processing block 314. A derived resource 1 316 is generated using the unique OID (e.g., OID ABACBC).

Figure 4:
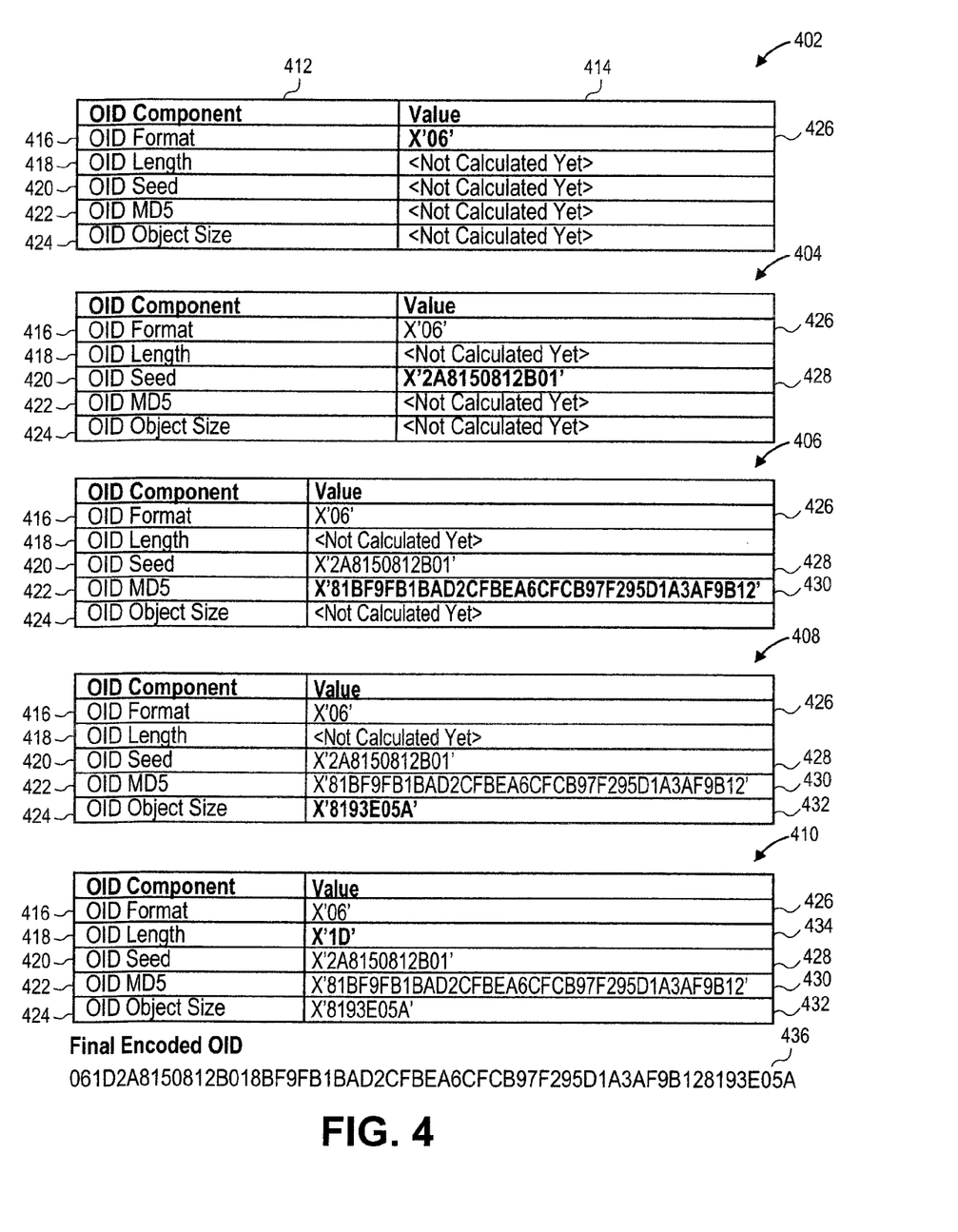
FIG. 4 illustrates an embodiment of a transaction sequence for calculating various components of a unique OID.

FIG. 4 illustrates an embodiment of a transaction sequence for calculating various components 416-424 of a unique OID. In the illustrated embodiment, various tables 402-410 are illustrated to show a transaction sequence for calculating various unique OID components 416-424. Each table 402-410 includes two columns: OID column 412 that lists various OID components 416-424 and value column 414 listing values of 426-432 of the corresponding OID components 416-424.

In the illustrated embodiment, X'06' is selected for a final ASN.1 format, shown in table 402 as a value 426 for OID format 416. In other words, the applied OID-encoding results in the X'06' value 426. Then, a CMOCA seed is selected, while the applied OID-encoding results in a value 428 for OID seed 420. Then, OID-encoding the previously-generated MD5 values results in a new value 430 for OID MD5 422. Further, OID-encoding the resource object size (e.g., Link Color Conversion Object size), which includes a sum of the base resources' sizes, results in a value 432 for OID Object Size 424.

The summation of the bytes to represent the sum of the values of OID-encoded format 416, OID-encoded MD5 422, and OID-encoded Object Size 424 provides a value 434 for a final OID length 418. The final encoded OID value 436 represents summation of all values 426-434 of the OID components 416-424.

Figure 5A:
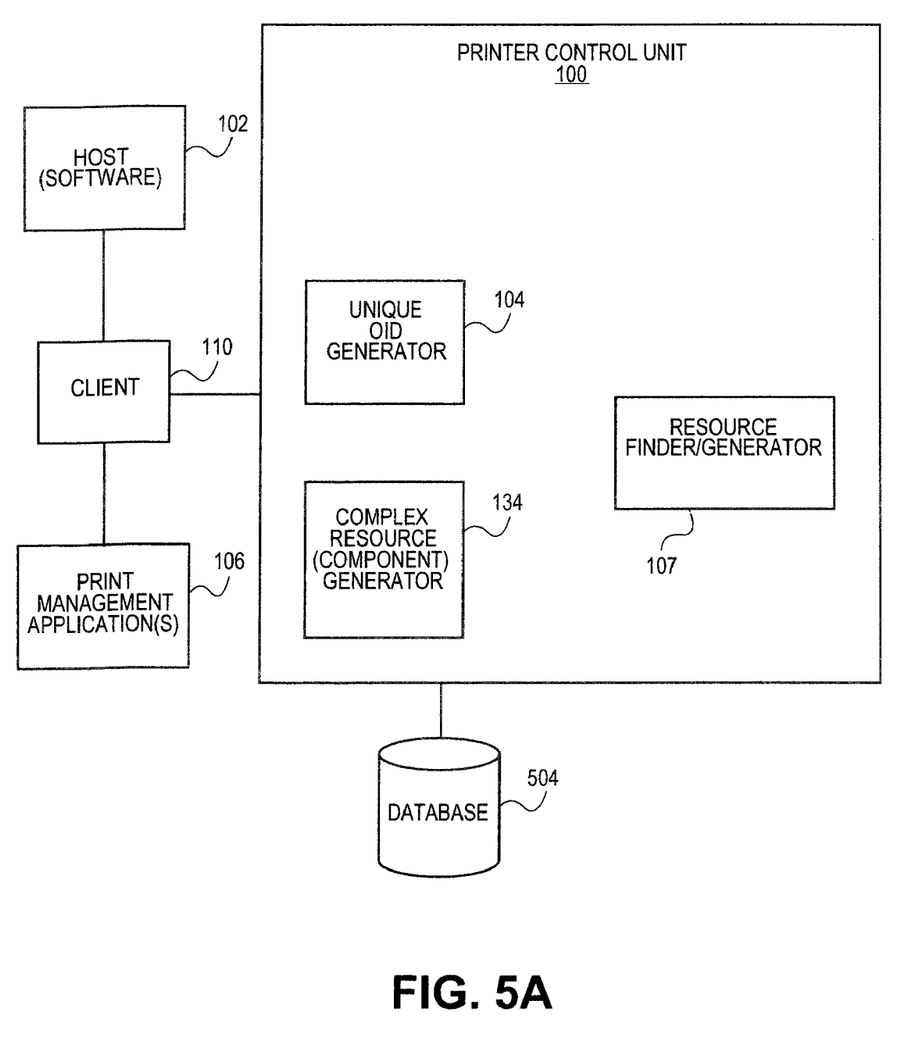
FIG. 5A illustrates an embodiment of a printer control unit of a printing system having a complex resource generator.

FIG. 5A illustrates an embodiment of a printer control unit 100 of a printing system having a complex resource (component) generator 134. For brevity, the components and functions of PCU 100 that are described elsewhere in this document, particularly with reference to FIGS. 1A-1B, are not being discussed here. In one embodiment, PCU 100 includes complex resource (component) generator 134 to generate partial or complete complex resource having resource components. A set of partial resource components are provided by host (software) 102 and received by other components at PCU 100. When host 102 fails to provide all the necessary resource components to PCU 100, the PCU 100 has to work with partial resource components to generate a derived resource. For example, host 102 may provide base resources having printing instructions, but may fail to provide other relevant components having printing information relevant or complementary to the printing information of the base resources. Hence, partial resource components are provided/received that are not sufficient to create a complete complex resource. However, a partial complex resource can be completed into a complete complex resource as newly generated resource components are added to the partial complex resource until it is completed.

Complex resource (component) generator 134 of PCU 10 creates a shell representing a final form of a complex resource (representing a derived resource), and organizes the provided PRCs in a manner to form a partial complex resource representing a partial derived resource. Unique OID generator 104 generates a resource OID to be associated with the partial complex resource representing a partial derived resource. The corresponding OID is then associated with the partial complex resource using the processing methods described thought this document (e.g., FIGS. 1A, 1B, 1C, and 2).

The new partial complex resource is then added to a resource-specific cache and saved to database 504. Further, registered resource listeners are notified of the complex resource updates. When a query for a resource component is received, the partial complex resource is referenced and queried for the requested resource component. The referencing and querying is performed using the unique OID corresponding to the partial complex resource. If the queried resource component is located within the partial complex resource, the cached resource component is referenced at database 504. If the resource component is not located (within the partial complex resource), the complex resource (component) generator 134 generates the requested resource component, and updates the partial complex resource at database 504 with the generated resource component for future referencing and use. Allowing recourse components of the partial complex resources to be referenced using unique OID, cached, and saved to a persistent database 504 eliminates overhead that would otherwise occur by spending valuable computational cycles generating resource components that may never be requested. Further, the eventual completion of the partial complex resource via accumulation of demand-generated resource components prevents future unnecessary PCU resource component generation when queried for the same complex resource. In one embodiment, complex resource (component) generator 134 performs in communication with resource finder/generator 107 to search, reference, find, generate, and/or cache/save, etc., resource component(s) and partial/complete complex resource(s). Complex resource generator also performs in communication with other components, such as unique OID generator 104, of PCU 100 to conduct any number of functions described in this document.

Figure 5B:
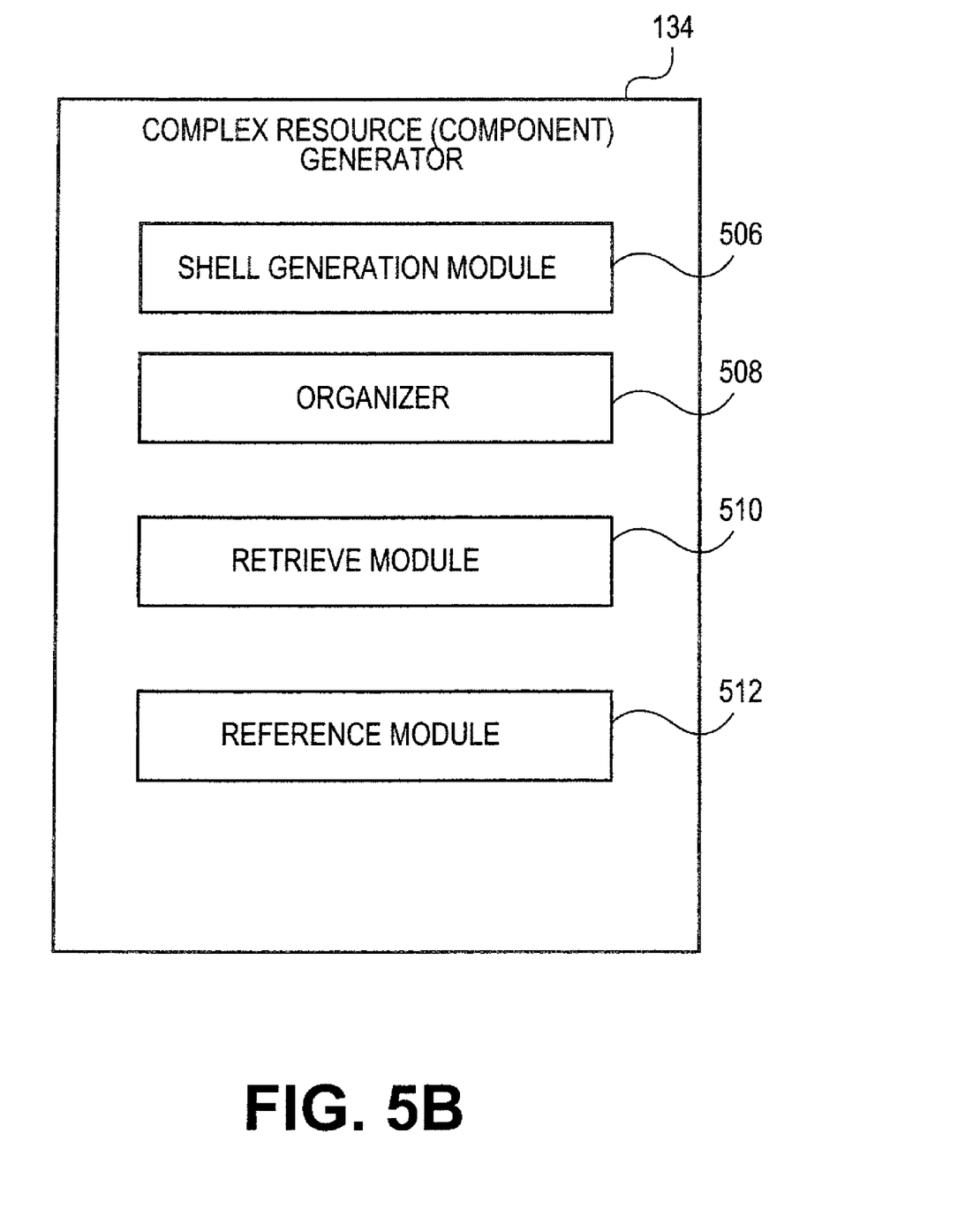
FIG. 5B illustrates an embodiment of a complex resource generator.

Now referencing FIG. 5B, it illustrates an embodiment of a complex resource (component) generator 134. Complex resource (component) generator 134 includes shell generation module 506 to generate a shell representing a final form of a complex resource (representing a derived resource). Organizer 508 is another module to organize the provided complex components in a manner to form a partial complex resource representing a derived resource. OID generator generates a resource OID and associates it with the partial complex resource. Retrieve module 510 is used to add any newly generated resource components to a partial complex resource or adding a newly generated resource component to a complete complex resource to replace an existing resource component. Retrieve module 510 is also to remove any resource components from a partial or complete complex resource; these resource components that are to be removed are outdated or are to be replaced with other newly generated resource components. Retrieve module 510 pulls complex resources from the database 504, while reference module 512 pulls one resource component out of the retrieved complex resources and returns it to the caller. Reference module 512 (may work with resource finder/generator) to reference or find resource components of partial/complete complex resources saved at a database. The referencing and querying of the partial/complete complex resources is performed using corresponding uniquely generated OIDs.

Figure 6:
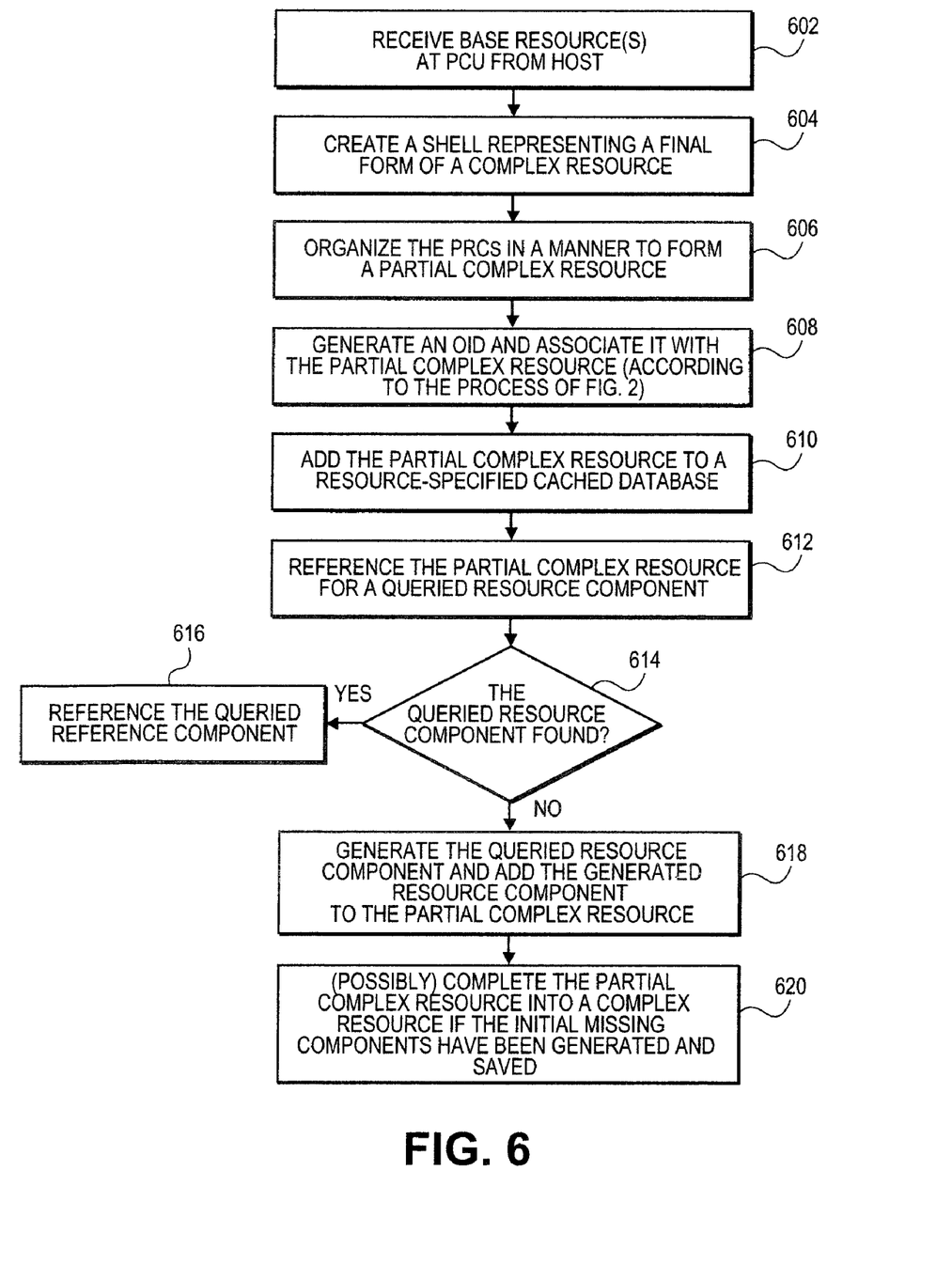
FIG. 6 illustrates an embodiment of a process for preserving and referencing partial resource components.

FIG. 6 illustrates an embodiment of a process for preserving and referencing partial resource components. At processing block 602, a set of base resources are provided by host (software) and received at PCU. At processing block 604, the PCU creates a shell representing a final form of a complex resource (representing a derived resource). At processing block 606, the provided PRCs are organized in a manner to form a partial complex resource representing a partial derived resource, and generate a resource OID to be associated with the partial complex resource representing a partial derived resource. At processing block 608, a corresponding OID is generated and associated with the partial complex resource using the processing methods described throughout this document (e.g., FIGS. 1A, 1B, and 2).

The new partial complex resource is then added to a resource-specified cache and saved to a database at processing block 610. Further, registered resource listeners are notified of the complex resource updates. When a query for a resource component is received, at processing block 612, the partial complex resource is referenced and queried for the resource component. At decision block 614, a decision is made as to whether the requested resource component is found at the partial complex resource. If the queried resource component is located at the partial complex resource, the resource component is referenced at processing block 616. The referencing and querying of the partial complex resource is performed using the uniquely generated OID corresponding to the partial complex resource. If the resource component is not located (at the partial complex resource), the PCU internally generates the requested resource component, and updates the partial complex resource cached or saved at the database with the generated resource component for future referencing and use at processing block 618. Allowing recourse components of the partial complex resources to be referenced, cached, and saved to a persistent database eliminates overhead that would otherwise occur by spending valuable computational cycles generating resource components that may never be requested. Further, at processing block 620, eventual completion of the partial complex resource via accumulation of demand-generated resource components prevents unnecessary printer control unit resource component generation when queried. In one embodiment, the partial complex resource is possibly completed into a complex resource if the initial missing components have been generated and saved.

Furthermore, usage statistics on each cached/saved complex resource containing GRCs determines which resources are removed from the cache and replaced by new complex resources using the MFU algorithm. When a cache hit occurs for a requested resource component on the (partial) complex resource, the resource usage indicator is updated. When a cache miss occurs on the (partial) complex resource and the (partial) complex resource (or the requested resource component of it) exists in the persistent database, the resource component with the lowest usage value is removed from the cache and replaced by the requested resource component retrieved from the persistent database. When a cache miss occurs on a (partial) complex resource and the requested resource component does not exist in the persistent database, the complex resource component generation process ensues to manufacture the requested complex resource component and to place the updated, possibly completed, complex resource into the cache (replacing the (partial) complex resource with the smallest MFU value) and saving the completed complex resource to the persistent database.

A set of partial or complete complex resources that are cached and stored in the persistent database are loaded into a configurable, resource-limited cache after a PCU initialization. For example, a resource component is loaded from the database cache to the resource cache during printer initialization, rather than during page processing, to enable page processing at rated speed. When the available collection of (partial) complex resources residing in the database is considered for caching, the largest subset of resources or resource components with the highest MFU values is cached. The reasoning behind this decision lies in the expectation that the most often used resources or resource components at the point when the printer experiences a power cycle are to continue to be the most often used resources or resource components even in newly submitted jobs to the printer.

Figure 7:
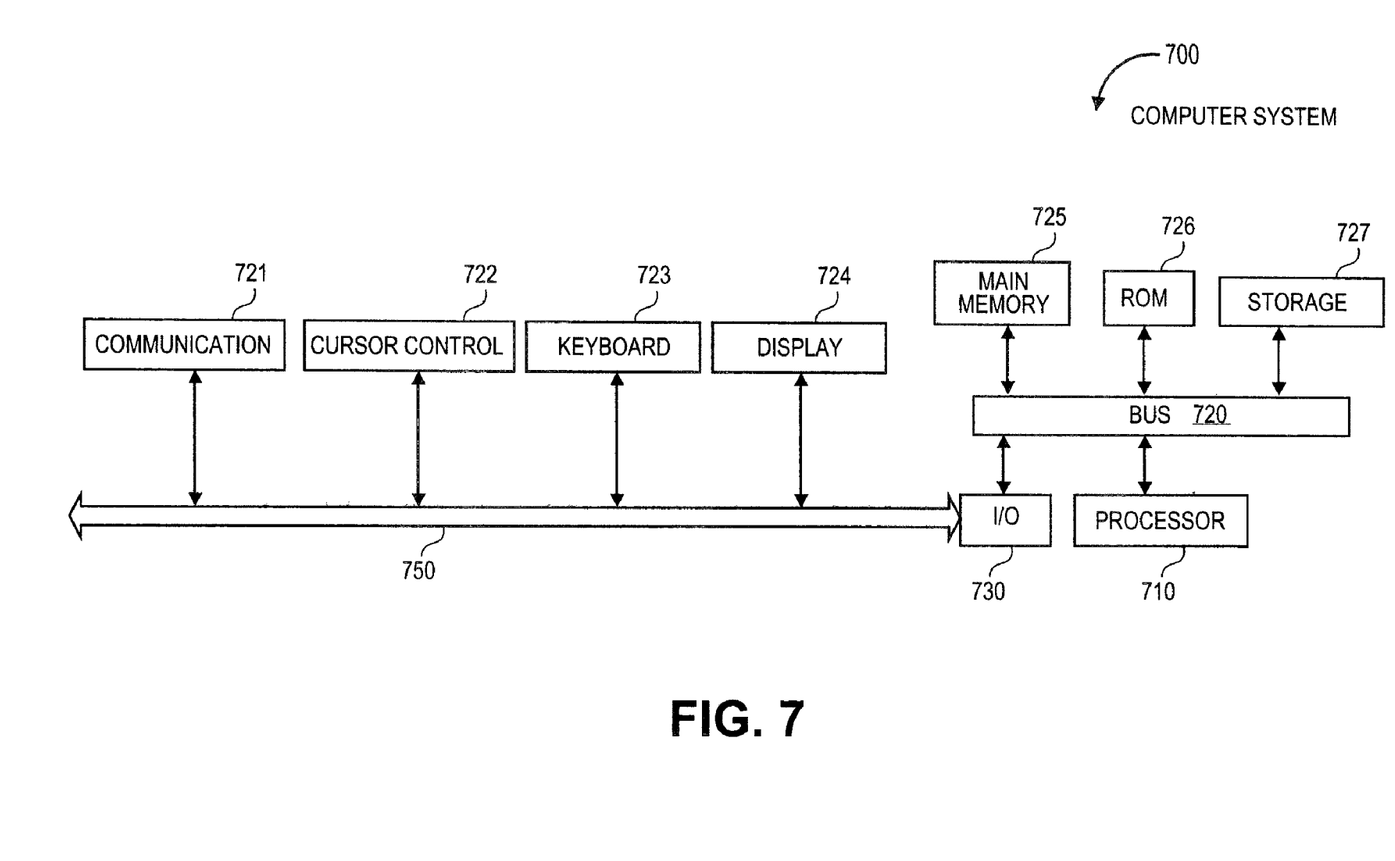
FIG. 7 illustrates a computer system on which an embodiment of a unique Object Identifier generator may be implemented.

FIG. 7 illustrates a computer system 700 on which an embodiment of a unique Object Identifier generator 104 may be implemented. Computer system 700 includes a system bus 720 for communicating information, and a processor 710 coupled to bus 720 for processing information. According to one embodiment, processor 710 is implemented using one of the multitudes of microprocessors. Nevertheless one of ordinary skill in the art will appreciate that other processors may be used.

Computer system 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Computer system 700 also may include a read only memory (ROM) and or other static storage device 726 coupled to bus 720 for storing static information and instructions used by processor 710.

A data storage device 725 such as a magnetic disk or optical disc and its corresponding drive may also be coupled to computer system 700 for storing information and instructions. Computer system 700 can also be coupled to a second input/output (I/O) bus 750 via an I/O interface 730. A plurality of I/O devices may be coupled to I/O bus 750, including a display device 724, an input device (e.g., an alphanumeric input device 723 and or a cursor control device 722). The communication device 721 is for accessing other computers (servers or clients) via external data network. The communication device 721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, compact disk-ROMs (CD-ROMs), and magneto-optical disks, ROMs, RAMs, erasable programming ROMs (EPROMs), electrically erasable programming ROMs (EEPROMs), magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A system comprising:
a print control unit coupled with a printer, the print control unit having a complex resource generator to receive partial resource components, the partial resource components including base resources such as printing instructions, wherein the complex resource generator to
generate a partial complex resource having the partial resource components, wherein the partial complex resource represents a partially derived resource from the base resources, wherein the partial complex resource is identified by a unique Object Identifier (OID) generated using the base resources as input;
generate a shell representing a final form of a complex resource, the shell to hold the partial complex resource;
store the partial complex resource within the shell such that the shell is used for subsequent accesses of the partial complex resource without having to regenerate the complex resource each time the partial complex resource is subsequently accessed; and
complete the partial complex resource into the complex resource by adding newly generated resource components to the partial complex resource that are queried and not located within the partial complex resource.

2. The system of claim 1, wherein the complex resource generator is further to reference the partial complex resources to identify each partial resource component via the unique Object Identifier (OID), wherein the complex resource generator to receive a request for a resource component.

3. The system of claim 2, wherein the complex resource generator is further to facilitate generation of the requested resource component if the requested resource component is not located at the partial complex resource.

4. The system of claim 3, where the complex resource generator is further to add the generated resource component to the partial complex resources.

5. The system of claim 1, wherein the complex resource represents a derived resource.

6. A method for providing computer services, comprising:
receiving partial resource components at a complex resource generator, the partial resource components including base resources such as printing instructions;

generate, using the complex resource generator, a partial complex resource having the partial resource components, wherein the partial complex resource represents a partially derived resource from the base resources, wherein the partial complex resource is identified by a unique Object Identifier (OID) generated using the base resources as input;

generating, using the complex resource generator, a shell representing a final form of a complex resource, the shell to hold the partial complex resource;

store the partial complex resources within the shell such that the shell is used for subsequent accesses of the partial complex resource without having to regenerate the complex resource each time the partial complex resource is subsequently accessed; and complete the partial complex resource into the complex resource by adding newly generated resource components to the partial complex resource that are queried and not located within the partial complex resource.

7. The method of claim 6, further comprising referencing the partial complex resource to identify each partial resource component via the unique Object Identifier (OID) in response to a request for a resource component.

8. The method of claim 7, further comprising generating the requested resource component if the requested resource component is not located at the partial complex resource.

9. The method of claim 8, further comprising adding the generated resource component to the partial complex resources.

10. The method of claim 6, wherein the complex resource represents a derived resource.

11. A computer program product of a non-transitory computer-storage medium usable with a programmable computer, the computer program product having computer-readable code embodied therein for providing computer services, the computer-readable code comprising instructions for:

receiving partial resource components at a complex resource generator, the partial resource components including base resources such printing instructions;

generate, using the complex resource generator, a partial complex resource having the partial resource components, wherein the partial complex resource represents a partially derived resource from the base resources, wherein the partial complex resource is identified by a unique Object Identifier (OID) generated using the base resources as input;

generating, using the complex resource generator, a shell representing a final form of a complex resource, the shell to hold the partial complex resource;

store the partial complex resources within the shell such that the shell is used for subsequent accesses of the partial complex resource without having to regenerate the complex resource each time the partial complex resource is subsequently accessed; and complete the partial complex resource into the complex resource by adding newly generated resource components to the partial complex resource that are queried and not located within the partial complex resource.

12. The computer program product of claim 11, wherein the computer-readable code further comprising instructions for referencing the partial complex resource to identify each partial resource component via the unique Object Identifier (OID) in response to a request for a resource component.

13. The computer program product of claim 12, wherein the computer-readable code further comprising instructions for generating the requested resource component if the requested resource component is not located at the partial complex resource.

14. The computer program product of claim 13, wherein the computer-readable code further comprising instructions for adding the generated resource component to the partial complex resources.

* * * * *